Sept. 20, 1966        R. GILMONT        3,273,763

MICROMETER BURET

Filed Jan. 22, 1965

INVENTOR
ROGER GILMONT
BY
ATTORNEY

United States Patent Office 3,273,763
Patented Sept. 20, 1966

3,273,763
MICROMETER BURET
Roger Gilmont, Douglaston, N.Y., assignor to Roger Gilmont Instruments, Inc., Great Neck, N.Y., a corporation of New York
Filed Jan. 22, 1965, Ser. No. 427,326
19 Claims. (Cl. 222—390)

The present invention relates to a device capable of measuring and dispensing quantities of liquid with high accuracy (that type of device hereinafter being generically termed a "buret"), and in particular to such a device which is highly resistant to the corrosive action of fluids with which it is to be used while at the same time providing a vacuum seal between the fixed and moveable parts of the device, and in which a high degree of smoothness and accuracy of operation is attained.

If the buret is to accurately carry out its measuring function the moveable plunger of the buret must be accurately and readily positioned. Moreover, the seal between the movable plunger and the reservior body should be vacuum-tight as well as liquid-tight in order to ensure that the position of the plunger accurately corresponds to the amount of liquid within the buret. Moreover, the means provided for producing the seal with the plunger must be such as not to contaminate the liquid being measured to any degree. In the past greases have been interposed between the moving parts of the buret in order to produce an effective seal and thus ensure accurate liquid measurement, but those greases tend to come into contact with the liquid being measured and contamination results. Seals have been produced through the use of rubber O-rings which are sealingly pressed against the plunger, but these O-rings, even when made of highly chemical resistant rubber sold under the trade name "Viton," are attacked by highly corrosive media, so that after an unduly short time the sealing effectiveness of those O-rings is impaired or destroyed, and in addition there is a tendency toward contamination of the liquid contained within the buret.

The problem of producing an effective seal against the movable plunger also affects the movability and accurate position-ability of that plunger. One of the most accurate positioning means available is of conventional micrometer construction and involves a rotatable element provided with a very fine and accurately machined screw thread. This element, when it is rotated, moves axially. When as is conventional, the buret plunger is secured to this element so as to be positioned thereby it must both rotate and translate. This dual movement of the plunger causes excessive wear on the sealing element or elements which engage the plunger. Moreover, since the tighter such elements press against the plunger the better is the seal, those sealing elements tend to produce a gripping or binding action on the plunger which militates against the ready positionability thereof. The better the seal, that is to say, the more tightly the sealing elements grip the plunger, and the greater is the problem in connection with wear and positionability.

It is the prime object of the present invention to devise a buret which represents perhaps the ultimate in accuracy but which is nevertheless subject only to a minor degree, if at all, to the problems set forth above, i.e. failure of seal through wear and chemical attack, contamination of reagents, and difficulty in positioning the plunger.

In accordance with the present invention the plunger, as it moves into and out from the reservoir body, is engaged by and slides through a gasket formed of appropriate chemically resistant synthetic material which produces a liquid-tight seal between itself and the plunger. This gasket also preferably engages the reservoir body so as to produce a liquid-tight seal between itself and the body.

It has been found that such materials, while capable of producing liquid-tight seals, are incapable of producing vacuum-tight seals. Rings of rubber-like material, when properly engaged with the plunger or the reservoir body, are capable of producing vacuum-tight seals but, as indicated above, they are too readily attacked by corrosive reagents. In accordance with the present invention O-rings formed of rubber or like material are used to produce vacuum-tight seals, but they are so located with respect to the operative parts of the buret as to be separated from the interior of the reservoir body by the liquid-tight seals produced by the gasket. Thus a rubber O-ring sealingly engages the plunger on the other side of the gasket from the reservoir body, and a rubber O-ring engages the reservoir body radially outside a ring of surface engagement between the gasket and the reservoir body. The liquid-tight seal produced by the gasket effectively protects the rubber O-rings from contact with the liquid which may be introduced in the buret and hence effectively prevents chemical attack on those vacuum-seal-producing O-rings.

The plunger is designed to be moved and positioned by a highly precise micrometer assembly which is mounted on the buret in any appropriate manner. A novel type of anti-friction rotatable connection utilizing a bearing ball or the like is provided between the plunger and the movable element of the micrometer assembly, so that although the micrometer element both rotates and axially translates, the plunger, as it slides through the sealing elements, need only translate. Hence wear on the sealing elements is minimized and smoothness of operation is maximized.

In addition, the buret of the present invention is so constructed as to be useable with pre-existing micrometer assemblies and to be readily assemblable and disassemblable for purposes of cleaning, repair and reconstruction, all to the end that a highly dependable and exceptionally accurate intrument is produced at a minimal cost consistent with its functional attributes.

To the accomplishment of the above, and to such other objects as may hereinafter appear, the present invention relates to the construction of a micrometer buret as defined in the appended claims and as described in this specification, taken together with the accompanying drawings, in which:

Figure 1:
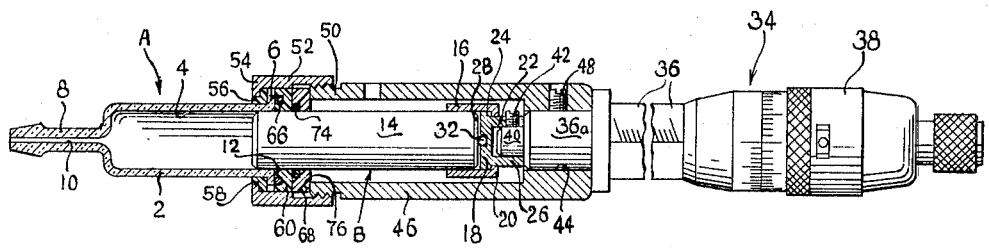
FIG. 1 is a side elevational view, partially broken away and cross sectioned, of one embodiment of the present invention.
Figure 2:
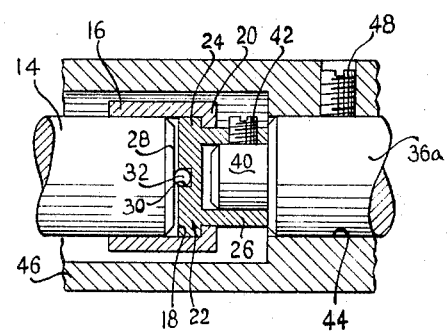
FIG. 2 is a cross sectional view, on an enlarged scale, of the connection between the micrometer assembly and the plunger of the buret of FIG. 1.
Figure 3:
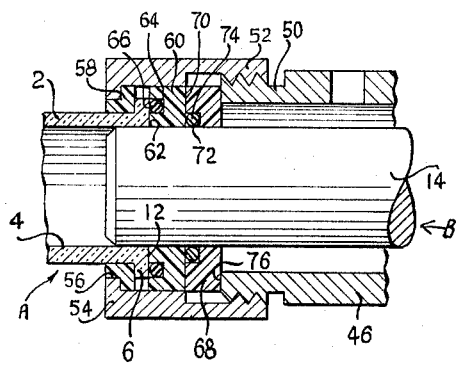
FIG. 3 is a cross sectional view, on an enlarged scale, of the sealing arrangement between the plunger and the reservoir body of the embodiment of FIG. 1.

Turning first to the embodiment of FIGS. 1-3, the liquid-measuring and liquid-dispensing elements of the buret of the present invention comprise a glass tube generally designated A defining the reservoir body and a plunger generally designated B and also preferably formed of glass. The glass tube A, in the specific design shown in FIG. 1, has a body portion 2 provided with a bore 4 which is very accurately dimensioned. A flange 6 is formed at one end of the body portion 2. The other end of the body portion 2 terminates in a tip 8 of pipette form which is quite elongated and which is provided with a narrow passage 10 communicating with the bore 4. The end surface 12 of the flange 6 is preferably smoothed and vacuum polished.

The plunger B has a body portion 14 which is accurately dimensioned to fit snugly within the bore 4 of the glass tube body part 2, preferably with an average clearance therebetween on the order of 5 microns. This degree of precision can be attached by the accurate grinding of the bore 4 and the external surface of the body portion 14, both of which may be formed of borosilicate glass. As a result the plunger body 14 is a slidable fit within the bore 2 but with an appreciable amount of friction exerted therebetween.

The body portion 14 of the plunger B, at its right hand end as viewed in the drawings, is fixedly received within a sleeve or cap 16 extending axially beyond the end surface 18 of the plunger body portion 14 and being there provided with a radially inwardly extending lip 20. A bearing member 22 is received within the cap 16. The bearing member 22 is provided with an outwardly extending lip 24 which is rotatably seated on the lip 20 of the cap 16, and has a tubular part 26 which extends out axially through the space inside the cap lip 20. The bearing member 22 has an end surface 28 which faces the end surface 18 of the plunger body portion 14. That surface 28 of the bearing member 22 is provided with a central aperture 30 within which a bearing ball 32 is received, the size of the bearing ball 32 being such that it extends out slightly beyond the surface 28. The plunger body portion 14 is inserted into the cap 16 sufficiently for its end surface 18 to engage the projecting portion of the ball 32, the surfaces 18 and 28 thus being spaced from one another by a distance corresponding to the amount that the ball 32 extends beyond the surface 28.

The bearing element 22 is adapted to be operatively connected to a micrometer assembly generally designated 34, that assembly comprising a body 36 provided with a rotary adjusting head 38 and having a rod 40 movably extending out from the body portion 36 in accordance with the position of the rotary head 38. The precise construction of the micrometer assembly 34 may take any known form, and constitutes no part of the present invention. The micrometer rod 40 is secured to the bearing element 22 by being received inside the tubular part 26 and fixedly connected thereto by set screw 42. Consequently both rotation and translation of the micrometer rod 40 is transmitted to the bearing element 22. However, since the cap 16 is rotatable relative to the bearing element 22, and particularly in view of the anti-friction relationship produced by the bearing ball 32 between the surfaces 18 and 28 of the plunger body portion 14 and bearing element 22 respectively, the body portion 14 of the plunger B will rigidly translate along with the micrometer rod 40 but is comparatively free to rotate relative thereto or, more realistically, not to rotate even though the micrometer rod 40 rotates.

The forward end 36a of the body portion 36 of the micrometer assembly 34 is received within aperture 44 formed at one end of the barrel 46, there being retained by means of set screw 48. The barrel extends forwardly over the plunger body portion 14 and terminates in an externally threaded portion 50 on which a nut 52 is threadedly received, that nut having an end wall 54 provided with a central passage 56 through which the reservoir body portion 2 extends. A washer 58 is interposed between the nut end wall 54 and the outwardly extending flange 6 of the reservoir A, thereby seating the reservoir A on the nut 52.

Resting on the end surface 12 of the body portion 2 is a gasket 60 formed of a highly chemically resistant synthetic material such as Teflon—a type of highly polymerized tetrahalogenated ethylene (polytetrafluoroethylene). It is received around the plunger body portion 14 and engages it with sufficient tightness to form a liquid-tight seal. An interference fit, involving a difference in size of between .001–.003 inch, is effective to this end. The gasket surface 62 is directed toward and engages the end surface 12 of the reservoir body flange 6. The gasket surface 62 is provided with a groove 64 radially outwardly spaced from the plunger body portion 14 and an O-ring 66 is received in that groove 64 and normally extends out therefrom so that it can be pressed into sealing engagement with the end surface 12 of the reservoir body flange 6. The O-ring 66 is formed of some appropriate highly chemically resistant rubber such as that sold under the trade name "Viton." The O-ring 66 effects a vacuum-tight seal between the gasket 60 and the reservoir flange 6, and is protected from contact with liquid by means of the liquid-tight seal defined by the radially inner portion of the gasket 60 which engages the reservoir body flange 6 over a ring-shaped area surrounding the plunger B.

A washer 68 formed of metal or appropriate synthetic plastic material surrounds the plunger body portion 14 and engages the surface 70 of the gasket 60 which is on the other side of the gasket 60 from the surface 62. That corner of the washer 68 which is oriented both toward the gasket 60 and toward the plunger body portion 14 is provided with a groove 72 within which an O-ring 74 is received, that O-ring also being formed of chemically resistant rubber-like material such as "Viton." The O-ring 74 extends out from the groove 72 so as to make sealing engagement with the plunger body portion 14 and also preferably with the gasket surface 70, thereby producing vacuum-tight seals with those surfaces. Liquid contact with the O-ring 72 is prevented by the liquid-tight seal defined between the gasket 60 and the plunger body portion 14.

When the barrel 46 is screwed into the cap 52, the end surface 72 of the barrel 46 engages the washer 68 and compresses the assembly comprising the washer 68, the O-ring 74, the gasket 60 and the O-ring 66 between itself and the reservoir body flange 6.

Figure 4:
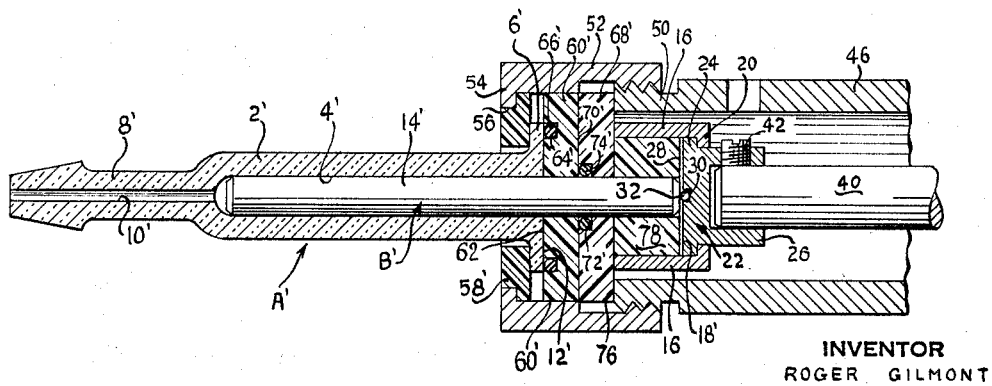
FIG. 4 is a cross sectional view of the left hand portion of the buret of FIG. 1 but with a smaller bore reservoir body and correspondingly smaller plunger substituted for the similar larger size elements shown in the embodiment of FIG. 1.

The embodiment of FIG. 4 differs from that of FIG. 3 in the the reservoir body A′ has a bore 4′ considerably smaller than that of the bore 4 in the embodiment of FIG. 1, the plunger B′ having a body portion 14′ which is of correspondingly smaller size. The plunger body portion 14′ may be connected to the micrometer rod 40 by the same elements as are employed in the embodiments of FIGS. 1–3, except that, because of the smaller size of the plunger body portion 14′, a washer 78 of any appropriate material such as polypropylene may be interposed between the cap 16 and the end of the plunger body portion 14′ received within that cap, the washer 78 being secured both to the cap 16 and to the plunger body portion 14′ in any appropriate manner, as through the use of a press fit. The washers 58′ and 68′ and the gasket 60′ of the embodiment of FIG. 4 correspond to the similarly numbered elements in the embodiment of FIGS. 1–3, except for such dimensional changes as may be required in order to appropriately cooperate with the smaller plunger body portion 14′ and the smaller reservoir body flange 6′.

The nut 52, washer 56, barrel 46, cap 16 and bearing element 22 may be made of metal or any other suitable structural material, and need not be manufactured to any particularly high degree of precision. The micrometer assembly 34 may be purchased and used as such. While the gasket 60 must be matched to the plunger B with which it is to be used, this is easily accomplished on a production basis. The O-rings 66 and 74 and the washer 68 may be standard items. The only place in the disclosed construction where a high degree of precision is preferable is with regard to the cooperating surfaces of the reservoir bore 4 and the plunger body portion 14. Thus the construction of the present invention can be manufactured quite inexpensively, with its precision determined in the main by the precision of the micrometer assembly 34. Assembly and disassembly is readily accomplished for purposes of cleaning. The combination of liquid-tight and vacuum-tight seals produced respectively by the gasket 60 and the O-rings 66 and 74 permit a very high degree of accuracy and reliability, with the vacuum-tight seals being protected against deterioration through chemical attack by the liquids introduced into the buret. Although there is necessarily an appreciable amount of sealing pressure against the plunger B, it can be smoothly and accurately moved to precisely the desired position, and with a minimal amount of wear on the sealing elements, by virtue of the rotatable bearing relationship produced by the bearing ball 32 between itself and the micrometer rod 40, thus permitting the plunger B to translate without rotation even though the micrometer rod 40 translates with rotation.

While but a limited number of specific embodiments of the present invention have been here disclosed, it will be apparent that many variations may be made therein, all within the scope of the instant invention as defined in the following claims.

I claim:

1. A buret comprising a reservoir body having an inner chamber with an aperture therethrough communicating with said chamber, a plunger slidable in said chamber operatively toward and away from said aperture, a positioning element operatively connected to said plunger for moving the latter, and mounting means for connecting said positioning element and said reservoir body; the improvement which comprises a gasket of chemically resistant material sealingly received over said plunger so that the latter is slidable therethrough, said gasket having a first surface directed toward said reservoir body, a first O-ring of rubber-like material sealingly engaged between said first gasket surface and said reservoir body, a second O-ring of rubber-like material sealingly received over said plunger on the other side of said gasket from said reservoir so that said plunger is slidable therethrough, and means for retaining said second O-ring in position.

2. The buret of claim 1, in which said retaining means for said second O-ring comprises a washer operatively engaging said gasket on the other side thereof from said reservoir and provided with a groove adjacent the corner thereof directed toward said plunger and said gasket, said second O-ring being received within said groove.

3. The buret of claim 2, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger.

4. The buret of claim 2, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger, said last mentioned means comprising a sleeve fixed to said plunger and projecting therefrom beyond said plunger surface, said positioning element comprising a first part and a second part fixed to said first part, extending therebeyond toward said plunger, and carrying said positioning element surface, said sleeve and said second part having interengaging means permitting their relative rotation and preventing their separation.

5. The buret of claim 2, in which said first surface of said gasket engages said reservoir body along a ring-shaped area surrounding said plunger and said first O-ring engages said reservoir body radially outwardly of said ring-shaped area.

6. The buret of claim 1, in which said first surface of said gasket engages said reservoir body along a ring-shaped area surrounding said plunger and said first O-ring engages said reservoir body radially outwardly of said ring-shaped area.

7. The buret of claim 6, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger.

8. The buret of claim 6, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger, said last mentioned means comprising a sleeve fixed to said plunger and projecting therefrom beyond said plunger surface, said positioning element comprising a first part and a second part fixed to said first part, extending therebeyond toward said plunger, and carrying said positioning element surface, said sleeve and said second part having interengaging means permitting their relative rotation and preventing their separation.

9. The buret of claim 1, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said position element relative to said plunger.

10. The buret of claim 1, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger, said last mentioned means comprising a sleeve fixed to said plunger and projecting therefrom beyond said plunger surface, said positioning element comprising a first part and a second part fixed to said first part, extending therebeyond toward said plunger, and carrying said positioning element surface, said sleeve and said second part having interengaging means permitting their relative rotation and preventing their separation.

11. The buret of claim 1, in which said retaining means for said second O-ring comprises a washer operatively engaging said gasket on the other side thereof from said reservoir and provided with a groove adjacent the corner thereof directed toward said plunger and said gasket, said second O-ring being received within said groove, said first surface of said gasket engaging said reservoir body along a ring-shaped area surrounding said plunger and said first O-ring of said ring-shaped area, and said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger.

12. The buret of claim 1, in which said retaining means for said second O-ring comprises a washer operatively engaging said gasket on the other side thereof from said reservoir and provided with a groove adjacent the corner thereof directed toward said plunger and said gasket, said second O-ring being received within said groove, said retaining means comprising an element pressing said washer against said gasket and pressing said gasket against said reservoir.

13. The buret of claim 12, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger.

14. The buret of claim 12, in which said first surface of said gasket engages said reservoir body along a ring-shaped area surrounding said plunger and said first O-ring engages said reservoir body radially outwardly of said ring-shaped area.

15. A buret comprising a reservoir body having an inner chamber with an aperture therethrough communicating with said chamber, a plunger slidable in said chamber operatively toward and away from said aperture, a positioning element operatively connected to said plunger for moving the latter, and mounting means for connecting said positioning element and said reservoir body; the improvement which comprises a gasket of chemically resistant material sealingly received over said plunger so that the latter is slidable therethrough, said gasket having a first surface directed toward said reservoir body, a first O-ring of rubber-like material sealingly engaged between said gasket surface and said reservoir body, a second O-ring of rubber-like material sealingly received over said plunger on the other side of said gasket from said reservoir so that said plunger is slidable therethrough, said second O-ring also sealingly engaging said gasket, and means for retaining said second O-ring in position.

16. The buret of claim 15, in which said retaining means for said second O-ring comprises a washer operatively engaging said gasket on the other side thereof from said reservoir and provided wtih a groove adjacent the corner thereof directed toward said plunger and said said gasket, said second O-ring being received within said groove, said retaining means comprising an element pressing said washer against said gasket and pressing said gasket against said reservoir.

17. The buret of claim 16, in which said positioning element and said plunger have opposed surfaces, one of said surfaces having an apertrue, a ball rotatably received in said apertrue, projecting beyond said one surface, and engaged by said other surface, and means connected between said positioning element and said plunger effective to retain said other surface against said ball and to permit rotation of said positioning element relative to said plunger.

18. The buret of claim 14, in which said positioning element and said plunger have opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger.

19. A buret comprising a reservoir body having an inner chamber with an aperture therethrough communicating with said chamber, a plunger slidable in said chamber operatively toward and away from said aperture, a positioning element operatively connected to said plunger for moving the latter, and mounting means for connecting said positioning element and said reservoir body; the improvement which comprises said positioning element and said plunger having opposed surfaces, one of said surfaces having an aperture, a ball rotatably received in said aperture, projecting beyond said one surface, and engaged by said other surface, and means connected between said positioning element and said plunger effective to retain said other surface against said ball and to permit rotation of said positioning element relative to said plunger, said last mentioned means comprising a sleeve fixed to said plunger and projecting therefrom beyond said plunger surface, said positioning element comprising a first part and a second part fixed to said first part, extending therebeyond toward said plunger, and carrying said positioning element surface, said sleeve and said second part having interengaging means permitting their relative rotation and preventing their separation.

References Cited by the Examiner

UNITED STATES PATENTS

| | | | |
|---|---|---|---|
| 1,645,898 | 10/1927 | Davis | 222—390 |
| 1,648,135 | 11/1927 | Klett | 128—218 |
| 2,412,295 | 12/1946 | Shaffer | 222—390 X |
| 2,660,342 | 11/1953 | Ruf | 222—309 |
| 2,899,106 | 8/1959 | Weinert | 222—193 X |

ROBERT B. REEVES, *Primary Examiner.*

STANLEY H. TOLLBERG, *Examiner.*